Sept. 2, 1969     P. L. CLEMENT ET AL     3,464,560

CHROMATOGRAPHIC CHAMBER

Filed June 28, 1968     2 Sheets-Sheet 1

INVENTORS
PIERRE L. CLEMENT
ANDRE F. P. LESTIENNE

BY Alfred P. Lorenzo
    Paul W. Holmes
ATTORNEYS

INVENTORS
PIERRE L. CLEMENT
ANDRE F. P. LESTIENNE

BY

ATTORNEYS

United States Patent Office 3,464,560
Patented Sept. 2, 1969

3,464,560
CHROMATOGRAPHIC CHAMBER
Pierre L. Clement and Andre F. P. Lestienne, Vincennes, France, assignors to Eastman Kodak Company, Rochester, N.Y., a corporation of New Jersey
Filed June 28, 1968, Ser. No. 741,035
Claims priority, application France, Oct. 9, 1967, 123,693
Int. Cl. B01d 15/08
U.S. Cl. 210—198         7 Claims

ABSTRACT OF THE DISCLOSURE

A compact chromatographic developing chamber comprising of a thin, elongated sleeve which is open at one end for introduction of a chromatographic sheet and closed at the other end and including a mass of absorbent material positioned within the sleeve at its closed end which serves to retain the chromatographic sheet in place and to hold an elution solvent which is released during the chromatographic development.

BACKGROUND OF THE INVENTION

Field of the invention

This invention relates to chromatography, and in particular it relates to a simple compact chromatographic developing chamber especially adapted for use in thin-layer chromatography.

Description of the prior art

A modern form of chromatography is the so-called "thin-layer" chromatography. The name is based on the use of an adsorption agent in the form of a thin-layer on an inert support. This arrangement possesses a number of known advantages as compared to other chromatographic techniques such as an adsorption column, paper chromatography, etc.

Thin-layer chromatographic elements can be developed in ordinary glass chambers such as a beaker, or in very thin sandwich-type chromatography chambers such as are described in United States Patent 3,189,541, issued June 15, 1965. In this type of apparatus the thin-layer chromatographic adsorbent layer is coated on one side of a glass plate. A thin gasket is placed along three edges of this plate and a second glass plate is placed over the adsorbent layer forming a thin chamber or air gap between the two plates. The sandwich is held together by clamps placed on the sealed sides. This thin chamber reaches equilibrium very quickly with the solvent vapor when the chromatogram is developed by placing the open end of the sandwich in a trough containing the elution solvent. This quick and near complete saturation is important in achieving optimum results from the chromatographic analysis.

While these previous devices provide means for carrying out thin-layer chromatographic analysis, they suffer from several disadvantages. First, because it is always necessary to assemble the plates and then mount the same in conjunction with the trough, the apparatus is quite awkward and inconvenient in use. Moreover, this type of apparatus is not economical.

SUMMARY OF THE INVENTION

It is a purpose of the present invention to provide a chamber, especially adapted for thin-layer chromatographic analysis, which is greatly simplified and much more economical than thin-layer chromatographic chambers known heretofore.

According to one feature of the present invention there is provided a small and relatively thin chamber in the form of an elongated sleeve, preferably composed of a stiff, transparent, plastic material which is unaffected by the chromatographic elution solvent. The chamber is open at a first end for reception of a chromatographic sheet having the thin-layer adsorbent material coated thereon and closed at its second end for receiving and holding the elution solvent.

It is desirable that the sleeve be very thin so that the atmosphere within the chamber will reach equilibrium with the elution solvent vapors as quickly as possible. The chamber also includes means for holding the chromatographic sheet therein in contact with the elution solvent reservoir, preferably in such a manner that the adsorbing layer on the sheet is substantially free from contact with the interior walls of the chamber.

The chamber can take many forms in practice. For example, the sleeve can be formed from a tubular material sealed at the bottom and open at the top; it can be formed from a flat layer of material folded over and sealed along one longitudinal edge and along the bottom; or it can be formed from a flat sheet of material folded so that its longitudinal edges form grooves for retaining the chromatographic sheet within the chamber.

Another important feature of the present invention is the provision of means for mounting within the chamber an encapsulated body of elution solvent positioned in such a manner that upon release of the solvent from the capsule the solvent will come into contact with the chromatographic sheet mounted within the chamber.

Another feature of the invention includes means for retaining the body of solvent at the bottom of the chamber during the development procedure, whether the solvent is introduced into the chamber just prior to use or whether it is included in encapsulated form. This means may comprise a porous absorbent body such as a cotton pad. Also, the capsule containing the elution solvent may be mounted within such absorbent material.

Thus, it is an object of this invention to provide a thin-layer chromatographic chamber which overcomes disadvantages of previous thin-layer chromatographic chambers.

It is another object of this invention to provide a simplified compact chromatographic chamber in the form of a sleeve having means for introducing the chromatographic sheet and having means for retaining a body of elution solvent.

It is still another object of this invention to provide a chromatographic chamber wherein the elution solvent is placed in the chamber prior to use in the form of an encapsulated body.

It is still another object of this invention to provide a chromatographic apparatus in the form of a thin, transparent plastic sleeve open at one end for receiving a chromatographic sheet and having means at its other end for retaining an elution solvent.

Other objects and the attendant advantages of the present invention will become apparent from the detailed description to follow together with the accompanying drawings.

DESCRIPTION OF THE PREFERRED EMBODIMENTS

Figure 1:
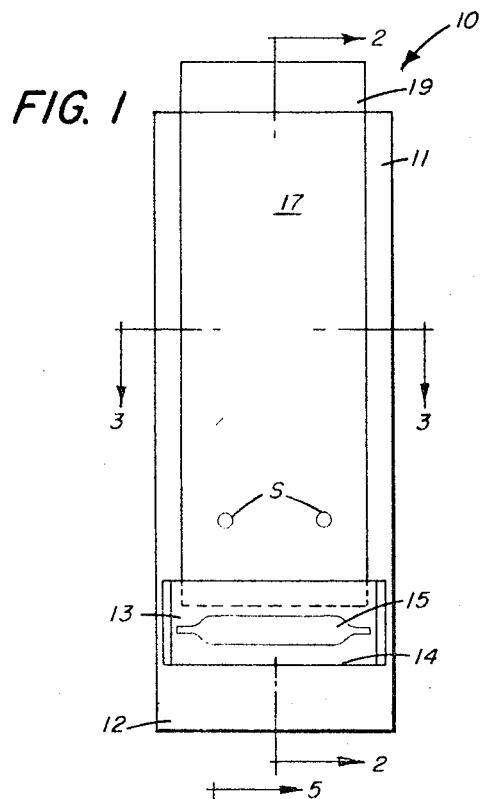
FIGURE 1 is an elevational view illustrating one embodiment of a chromatographic chamber according to the present invention.
Figure 2:
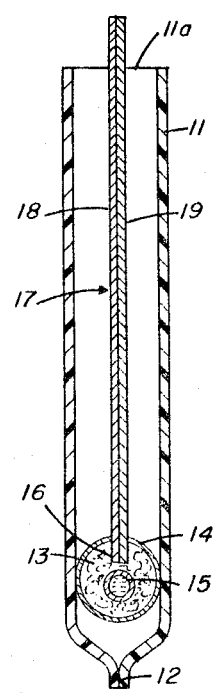
FIGURE 2 is a vertical sectional view taken along lines 2—2 of FIGURE 1.
Figure 3:
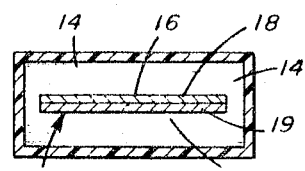
FIGURE 3 is a horizontal sectional view taken along line 3—3 of FIGURE 1.

Referring now to FIGURES 1–3, there is shown a chromatographic chamber 10 including a sleeve 11 in the form of a tube flattened out and heat sealed across the bottom at seam 12. It is preferred that the sleeve be formed of a material such as a polyester, e.g., polyethylene terephthalate or the like, which is chemically inert with respect to chromatogrphic elution solvents. For example, the sleeve can be formed from 0.15 mm. thick polyethylene terephthalate sheeting sold under the trademark Mylar.

Advantageously, the internal capacity of the chamber is kept as small as possible, so that solvent vapor saturation of the atmosphere therein is reached as soon as possible after the initiation of the chromatographic development procedure. The sleeve includes an aramgement for mounting the chromatographic sheet so that the adsorbing layer is substantially free from contact with the internal walls of the sleeve. The sleeve further includes a upper open end 11a which can be pinched closed by a clamp after insertion of the chromatographic sheet. At the closed end, adjacent the seam 12, there is provided an absorbent porous block 13, formed of cotton or similar material, for retention of the elution solvent. By retaining the solvent within this absorbent block, a more even distribution of the solvent on the chromatographic sheet during development is provided.

As also shown in FIGURE 1, capsule 15 containing elution solvent is embedded in porous block 13 located within sleeve 11. A waterproof casing 14, composed of a flexible material such as polyethylene terephthalate, surrounds both the capsule 15 and the porous block 13. Capsule 15 is adapted to be opened to release the solvent into porous block 13 at the desired time.

A chromatographic sheet 17 mounted within sleeve 11 is held by a slot 16 on the upper side of casing 14 so that the adsorbent layer 19 does not come into contact with the internal walls of the sleeve. The sheet 17 has a backing layer 18, and a thin adsorbent layer 19 which is spotted (as at S) with the substance to be analyzed before insertion into the sleeve. When assembling the apparatus, the sheet 17 is first inserted into slot 16 to form a unit with the capsule assembly, after which the sheet is spotted with the substance to be analyzed. The entire unit is then inserted into the sleeve 11.

The capsule 15 may be opened at will be for releasing elution solvent by any suitable means. For example, capsule 15 may comprise micro-capsules of glass or hardened gelatin capable of bursting under the action of pressure or heat. More commonly, capsule 15 is formed from frangible glass or plastic which can be easily crushed by an external force at the time of use, as by pinching together the sides of the sleeve 11.

Figure 4:
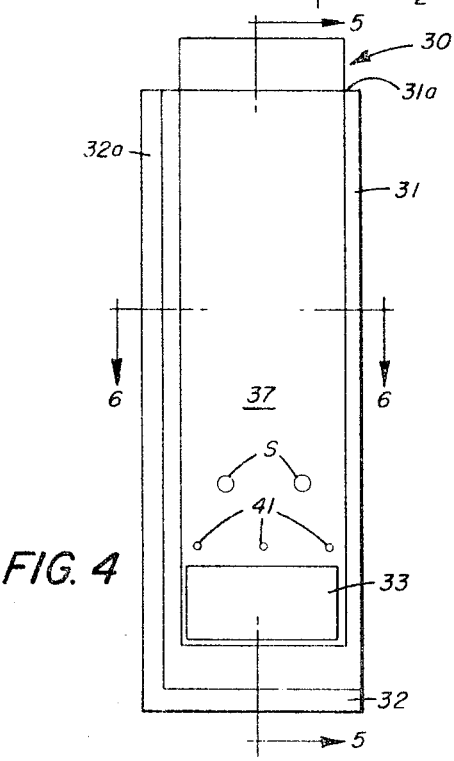
FIGURE 4 illustrates another embodiment of the present invention.
Figure 5:
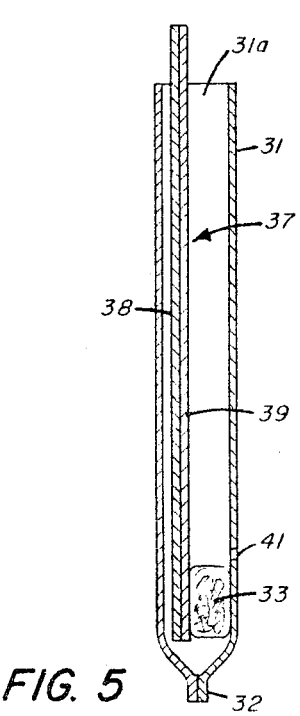
FIGURE 5 is a vertical secitonal view taken along line 5—5 of FIGURE 4.
Figure 6:
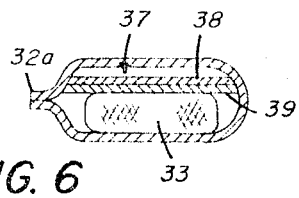
FIGURE 6 is a horizontal sectional view taken along line 6—6 of FIGURE 4.

FIGURES 4–6 illustrate another embodiment of the invention. In FIGURE 4 there is shown a modified chamber 30 in the form of a sleeve 31 formed from a sheet of the same material as the embodiment of FIGURE 1 folded and sealed along the bottom at 32 and along a longitudinal edge at 32a and including an upper opening 31a.

In the embodiment of FIGURE 4 there is also shown a porous absorbent block 33, for example, a pad of cotton, and a chromatographic sheet 37 having a backing layer 38 and an adsorbent layer 39. As is evident from FIGURES 5 and 6, the spotted sheet 37 is inserted into the chamber and the porous block holds it in such a position that its adsorbent surface 39 does not contact the internal walls of the chamber.

While the embodiment of FIGURES 4–6 can include a capsule of solvent as shown in FIGURES 1–3, in this embodiment the capsule has not been shown. Therefore, the block 33 is inserted without solvent and the solvent is added at the time of use by means of a syringe which is inserted through the small holes shown at 41.

Figure 7:
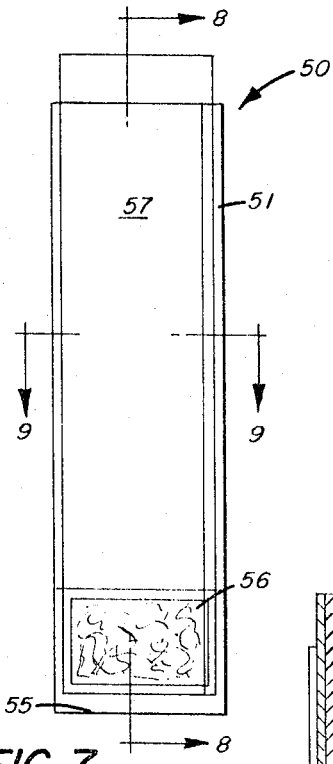
FIGURE 7 illustrates still another embodiment of the invention.
Figure 9:
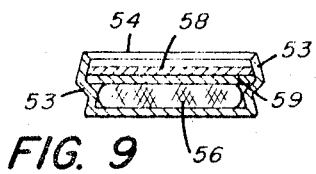
FIGURE 9 is a horizontal sectional view taken along line 9—9 of FIGURE 7.
Figure 8:
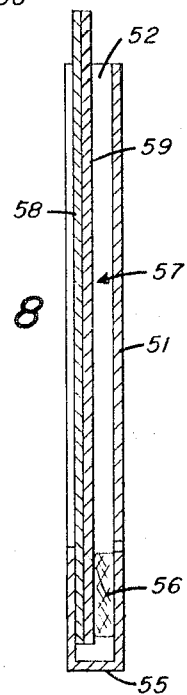
FIGURE 8 is a vertical sectional view taken along line 8—8 of FIGURE 7.

FIGURES 7–9 illustrate still another embodiment of the invention. There is shown therein a modified chamber 50 including a sleeve 51 formed from the same material as the embodiments of FIGURES 1–6. This sleeve has an upper opening 52 and accordion-like folds in the sides 53, the folds being designed for receiving and retaining a chromatographic sheet 57 so as to close off the open back 54 of the sleeve. The lower portion of the sleeve is closed off by a bottom member 55 forming a trough in which a porous absorbent block 56 is retained. The sheet 57 has an adsorbent layer 59 on a backing layer 58. It will be noted that the block 56 is so positioned in the bottom member 55 as to prevent contact between the adsorbent layer 59 and the internal walls of the sleeve 51. Thus, in this embodiment, the sheet 57 itself forms one side of the sleeve to close off the chamber. However, the end result is the same as in the other embodiments in that a small, easily saturated chamber is provided.

While the embodiment of FIGURES 7–9 is shown with a cotton block similar to that shown in the embodiment of FIGURES 4–6, it will be evident that the capsule 15 of FIGURES 1–3 can also be employed in the embodiment of FIGURES 7–9.

The apparatus of this invention is not limited to particular materials of construction nor to specific elution solvents or materials to be analyzed. It is particularly adapted for use in thin-layer chromatography but it will be apparent that it is also applicable to use in paper chromatography.

We claim:

1. An apparatus for use in developing a thin-layer chromatographic sheet, comprising an elongated sleeve closed at one end and open at the opposite end to receive therein such chromatographic sheet, a body of porous absorbent material within said sleeve adjacent to said closed end for holding an elution solvent in contact with the received chromatographic sheet to release the solvent onto the sheet during chromatographic development, and a frangible capsule containing elution solvent disposed in said sleeve adjacent to said closed end for releasing the solvent contained therein into said body of porous absorbent material upon opening the capsule within the sleeve.

2. A chromatographic developing apparatus as described in claim 1 wherein said sleeve is sufficiently flexible to allow breaking of said capsule within said sleeve without removal of said capsule therefrom.

3. A chromatographic developing apparatus as described in claim 2 including a casing for supporting the chromatographic sheet surrounding said capsule and said body of porous absorbent material, said casing having a slot therein for receiving one end of the chromatographic sheet and being sufficiently flexible to allow breaking of said capsule within said casing.

4. A chromatographic developing apparatus as described in claim 1 wherein said body of porous absorbent material positions the chromatographic sheet so that at least one side thereof is substantially free from contact with the interior surface of said sleeve.

5. A chromatographic developing apparatus as described in claim 1 wherein said body of porous absorbent material is a cotton pad.

6. A chromatographic developing apparatus as described in claim 1 wherein said sleeve is substantialy transparent.

7. A chromatographic developing apparatus as described in claim 1 wherein said sleeve is composed of polyethylene terephthalate.

References Cited

UNITED STATES PATENTS 2,723,756   11/1955   Miller et al. _____ 210—198 X

JAMES L. DECESARE, Primary Examiner

U.S. Cl. X.R.

210—31